Oct. 3, 1933.  O. POEN  1,928,868
HARVESTING MACHINE
Filed Nov. 19, 1931  3 Sheets-Sheet 1
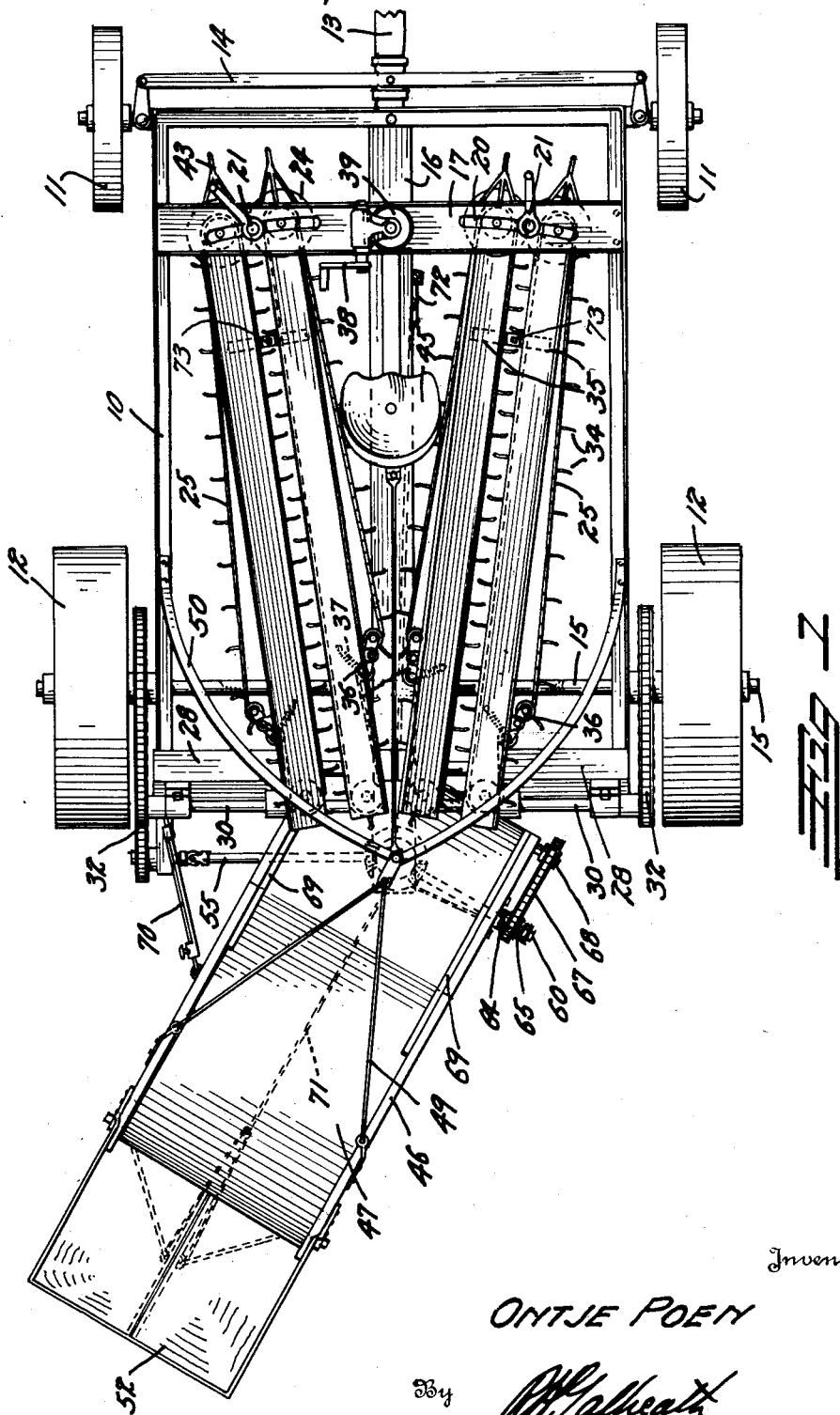
Inventor
ONTJE POEN
By
Attorney

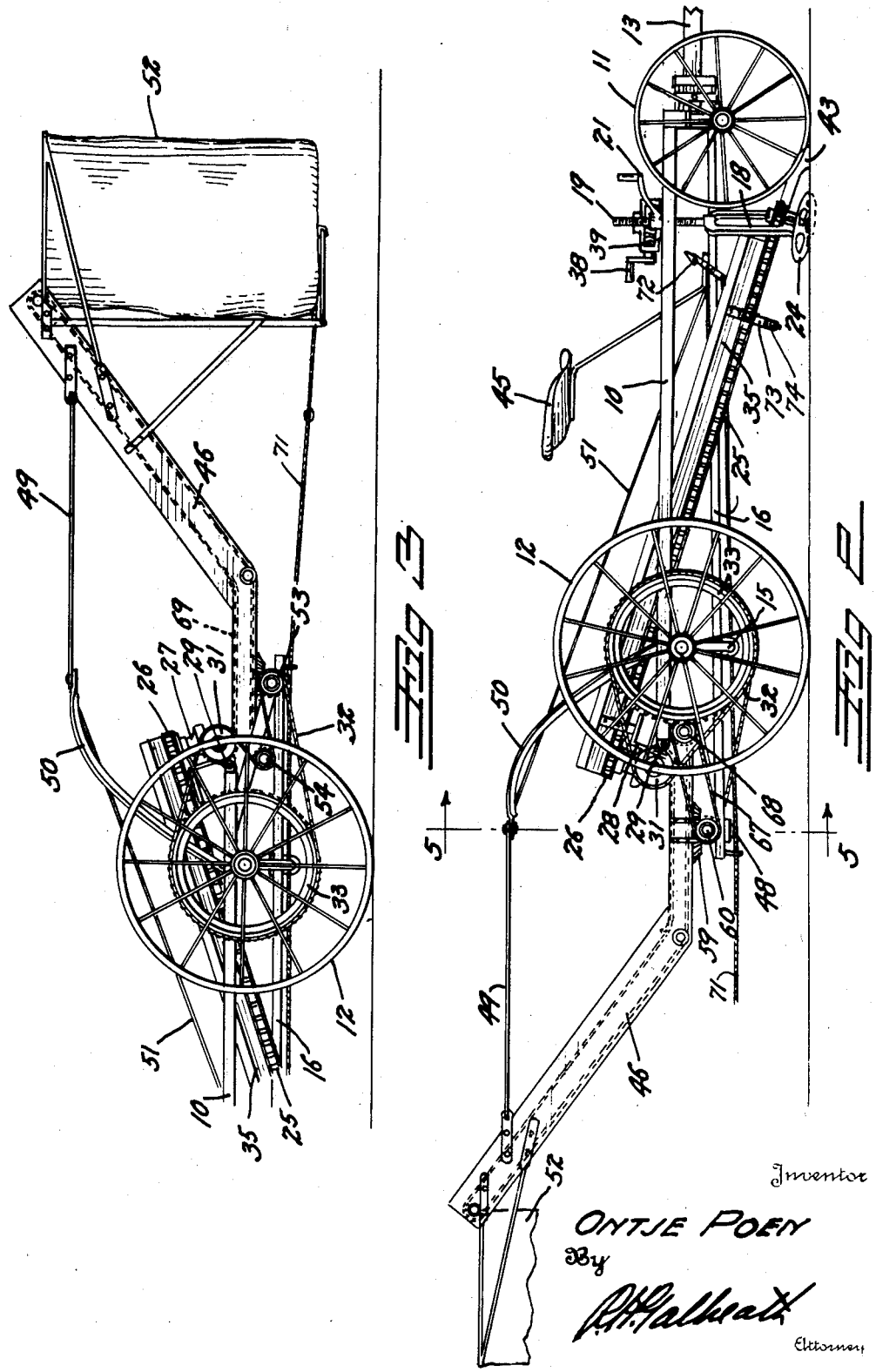

Oct. 3, 1933.   O. POEN   1,928,868
HARVESTING MACHINE
Filed Nov. 19, 1931   3 Sheets-Sheet 3
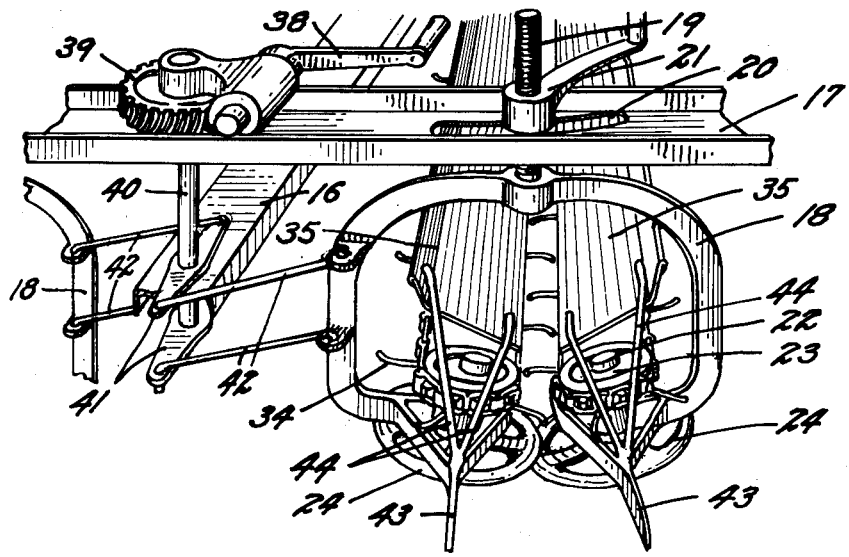
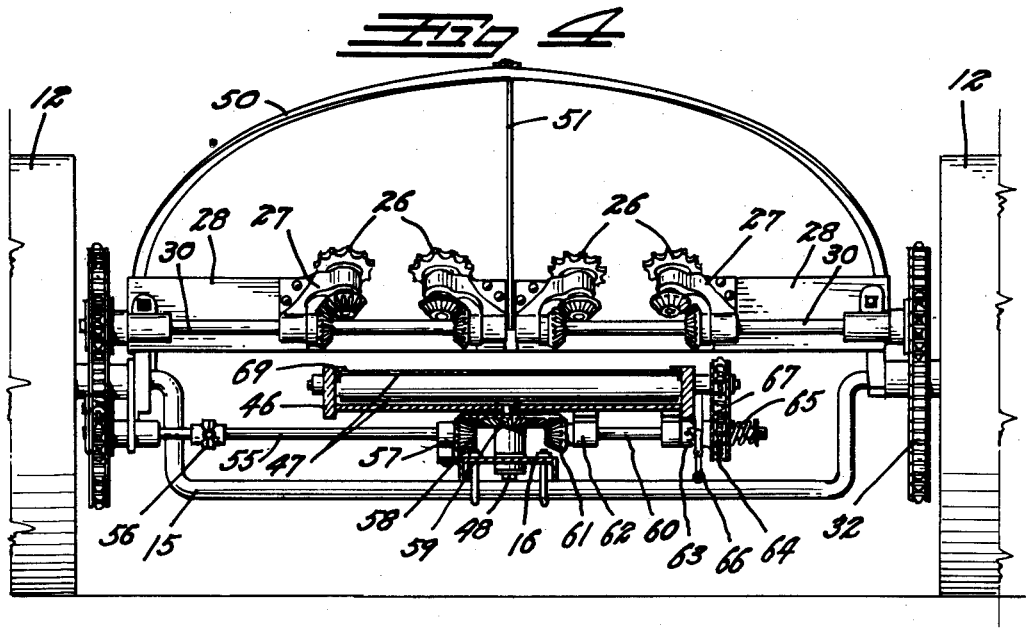
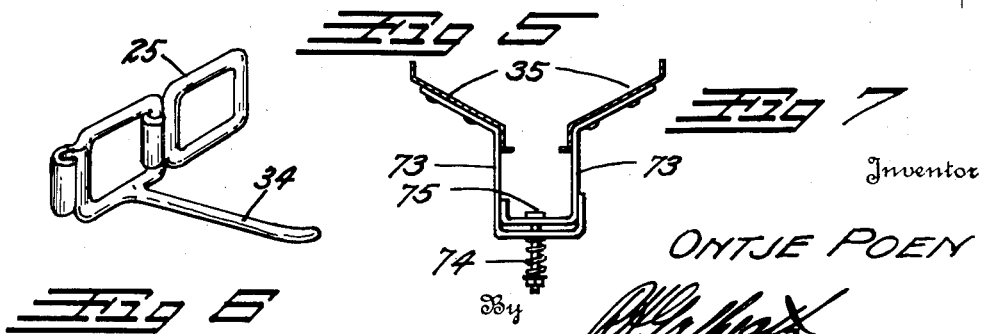
Inventor
ONTJE POEN
By
Attorney Patented Oct. 3, 1933

1,928,868

UNITED STATES PATENT OFFICE 1,928,868

HARVESTING MACHINE

Ontje Poen, Matheson, Colo.

Application November 19, 1931
Serial No. 576,181

9 Claims. (Cl. 56—157)

This invention relates to a harvesting machine, more particularly designed for vine plants, such as beans, peas, etc., and has for its principal object the provision of a harvesting machine which, when drawn along the rows of plants, will cut the vines, gather and elevate them to a piling device, and leave them in neat piles on the field.

Another object of the invention is to so construct the machine that it will handle a plurality of rows of vines simultaneously and so that it can be adjusted to accommodate different row spacings.

Still another object of the invention is to so construct the piling device that it can be swung to deposit the piles at either side of, or in the rear of the machine.

A further object of the invention is to provide efficient adjustment for the cutters so that the vines can be cut at any desired height, together with means for lifting the vines from the ground before the cutting operation so that they will not be damaged by the cutters.

Other objects and advantages reside in the detail construction of the invention, which is designed for simplicity, economy, and efficiency. These will become more apparent from the following description.

In the following detailed description of the invention reference is had to the accompanying drawings which form a part hereof. Like numerals refer to like parts in all views of the drawings and throughout the description.

In the drawings:—

Fig. 1 is a plan view of the complete machine.

Fig. 2 is a right side view thereof.

Fig. 3 is a left side view of the rear portion of the machine.

Fig. 4 is a fragmentary detail perspective view of the forward extremity of the vine elevator illustrating the cutting knives.

Fig. 5 illustrates a lateral section taken on the line 5—5, Fig. 2. In this view the elevating chains and guide members have been omitted for the sake of clearness.

Fig. 6 is a detail view of a portion of the link belt elevating chain.

Fig. 7 is a detail section through one of the guide channels illustrating the resilient construction of the cross brace members.

The invention comprises a main frame 10 supported on forward guide wheels 11 and rear drive wheels 12. The guide wheels 11 are arranged to be directed from a tongue 13 through the medium of a steering connecting rod 14. The rear drive wheels are free to rotate upon a drop axle 15 which extends entirely across and beneath the frame 10. A longitudinal strut 16 extends through the middle of the frame 10 and projects beyond the rear thereof. A lateral channel member 17 extends across the frame 10 adjacent its forward extremity.

A pair of yokes 18 are suspended from threaded shafts 19 which extend through arcuate slots 20 in the cross channels 17. The threaded shafts 19 receive threaded nuts 21 formed with suitable handles for convenient rotation. Short stud shafts 22 are supported in suitable bearings by the yokes 18 at their lower extremities. Each of the stud shafts is provided with a sprocket 23 and a circular cutter knife 24. The two circular knives of each yoke co-operate with each other to exert a shearing or cutting action on each row of vines over which the machine is driven.

The two yokes 18 can be separated or brought together to accommodate various plant row spacings by means of a crank handle 38. The crank 38 operates a worm gear 39 secured on a vertical shaft 40. The lower extremity of the shaft 40 is provided with a pair of double levers 41, the extremities of each of which are connected by means of connecting links 42 to each of the yokes 18. Thus, by rotating the crank 38 the operator can cause to be drawn toward or pushed away from each other with the threaded shafts 19 travelling in the arcuate slots 20.

An endless link belt elevator chain 25 extends rearwardly from each of the sprockets 23 to an elevator sprocket 26. The elevator chains 25 are provided with spaced apart lifting prongs 34, as shown in Fig. 6. A chain tightening bar 36 is placed in the path of the descending side of each elevating belt. The bars 36 are pivoted at their middles and are provided with idler wheels at their extremities over which the elevator belt travels. Tension springs 37 constantly tend to turn the bars 36 so as to place a constant tension in the link belts.

The elevator sprockets 26 are supported on short stud shafts which are carried in suitable journal brackets 27. The journal brackets 27 are mounted upon lateral angle members 28, which are in turn hinged, as shown at 29, to the frame 10.

The elevator sprockets 26 are driven from counter shafts 30, there being one counter shaft for each pair of sprockets, as shown in Fig. 5. The counter shafts 30 are supported in suitable bearings on the angle members 28 and terminate in driven sprockets 31. The driven sprockets 31 are driven through the medium of a sprocket chain 32 from drive gears 33 mounted on the rear drive wheels 12.

A sheet metal channel guide member 35 is placed above each of the elevating chains. The pairs of channel guide members together form guide channels above each pair of chains which act as slides to support and guide the vines as they are carried upwardly and rearwardly by the prongs 34. Vine lifting plows 43 project forwardly from the yokes 18 in front of the sprockets 23. These plows are provided with guide prongs 44 which act to lift and gather the vines into the channel formed by the guide members 35.

In use, the machine is drawn along two rows of vines. The cutting blades 24 are positioned by means of the crank nuts 21 so as to cut the vines approximately at the ground surface and the blades are aligned with the rows by the means of the crank 38. The vine lifting plows lift the vines from the ground before they are severed so that they will not be damaged by the knives. The prongs 34 then engage the vines and slide them between the channel members 35 to the rear of the machine. The operator is seated upon a suitable seat 45 where he can easily reach the crank 38 for directing the blades along the rows and the cranks 21 for elevating or lowering the blades while the machine is in operation.

The vines can be collected at the rear of the machine in any suitable receiving apparatus or can, if desired, be allowed to pile along the two rows being harvested. It is preferred, however, to provide an elevating and piling device as illustrated. The elevating and piling device comprises a conveyor frame 46 within which an endless conveyor belt 47 is arranged to travel. At its forward extremity the conveyor frame 46 is pivoted upon a pivot shaft 48 supported upon the rearward extension of the longitudinal frame member 16. At its rearward extremity it is supported by hangers 49 which are pivotally connected to a bracket 50 which projects upwardly and rearwardly from the frame 10. The bracket 50 is braced by means of a tension member 51. It can be readily seen from the above that the conveyor frame 46 can be readily swung to either side of the machine. A suitable sack or collector 52 is arranged at the terminus of the elevator to receive the vines.

The conveyor belt 47 is operated from one of the drive wheels 12 through the medium of a sprocket 53 over which one of the drive chains 32 is trained, as shown in Fig. 3. An idler sprocket 54 is employed to force the chain about both the sprocket 53 and the drive sprocket 31. The sprocket 53 drives a conveyor drive shaft 55, in which a suitable universal joint 56 is inserted. The inner extremity of the shaft 55 is journaled in a bracket bearing 57 upon the frame member 16 and is provided with a bevel pinion 58 which drives an idler bevel gear 59 which is arranged to rotate about the pivot 48.

The rotation of the idler bevel gear 59 is transmitted to a counter-shaft 60 through a second bevel pinion 61. The shaft 60 is supported in suitable bearings 62 from the conveyor frame 46, so that it is free to swing therewith. The counter-shaft 60 drives a clutch dog 63 with which a clutch sprocket 64 is held in engagement by means of a compression spring 65. The clutch sprocket 64 can be thrown out of engagement with the clutch dog 63 through the operation of any of the usual clutch yokes 66.

The clutch sprocket 64 is connected through the medium of a short sprocket chain 67 with a roller sprocket 68 which is carried on the shaft of one of the rollers over which the conveyor belt 47 is trained. The upper reach of the conveyor belt 47 is maintained horizontal at its forward extremity by means of inwardly projecting guide flanges or slides 69. The conveyor frame is held in any desired position by means of an extendable angle brace 70.

The vines fall from the delivery end of the elevator chains 25 upon the conveyor belt 47 and are then elevated and deposited in the collector 52. The collector may be provided with any desired dumping bottom operated by means of a pull cable 71 which leads to a foot pedal 72 at the operator's position. A second cable can be connected from the foot pedal 72 to the clutch yoke 66 so that each time the operator dumps the collector 52 the conveyor belt 47 will stop so as not to scatter vines through the open bottom of the collector. When pressure on the foot pedal 72 is released to close the collector the spring 65 will then throw the clutch sprocket 64 into engagement with the clutch dog 63 and start the conveyor.

Each pair of channel members 35 is maintained in spaced relation by means of a cross brace as illustrated in Fig. 7. Each of these cross braces are formed from two downwardly looped, interlocking bars 73, one of which is vertically movable within the other, as illustrated. The uppermost bar is constantly pulled down by means of a compression spring 74 and a bolt 75. In describing the function of this flexible cross brace it is necessary to note that one of the circular knives 24 overlaps the other as shown in Fig. 4. The knife bearings are connected to the guide members 35. Thus, since the spring 74 constantly acts to pull one of the guide members down and push the other one up it will also act to constantly push the two knives together and will allow them to separate should a stone or stick come between them.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:—

1. A harvesting machine adapted to be drawn along rows of plants comprising: a pair of co-acting cutting knives arranged to cut the plants along the rows; a pair of co-acting chains arranged to engage the sides of and elevate the cut plants between them; means for receiving the plants from said chains; and a pair of channel members arranged to slidably support said plants as they are elevated, said channel members being spaced apart to allow an intervening slot for the action of said chains.

2. A harvesting machine comprising: a wheeled frame; a cross member in said frame; inverted U-shaped yokes suspended from said cross member; cutting knives journalled on the lower extremities of said yokes; means for varying the lateral position of said yokes on said cross member so as to align them with the plant rows; threaded studs extending upwardly from said yokes through arcuate slots in said cross member; and rotatable nuts carried by said studs to vary the height of said knives.

3. A harvesting machine comprising: a supporting frame; drive wheels supporting the rear extremity of said frame; guide wheels supporting the forward extremity of said frame; conveyor members extending from above the rear extremity of said frame downwardly and outwardly below the forward extremity of said frame so as to align at their forward extremities with two plant rows; rotary cutting knives journalled at the forward extremities of said conveyor members and adapted to sever the plants along the rows; guide members extending forwardly from said cutting knives so as to elevate the plants before the cutting operation; a channel member extending rearwardly from each cutting knife said channel members co-acting to form an open bottomed channels along which said conveyor members convey said plants.

4. A harvesting machine comprising: a supporting frame; drive wheels supporting the rear extremity of said frame; guide wheels supporting the forward extremity of said frame; conveyor members extending from above the rear extremity of said frame downwardly and outwardly below the forward extremity of said frame so as to align at their forward extremities with two plant rows; rotary cutting knives journalled at the forward extremities of said conveyor members and adapted to sever the plants along the rows; guide members extending forwardly from said cutting knives so as to elevate the plants before the cutting operation; and means for causing the forward extremities of said conveyor members to approach or move away from each other so as to align them with adjacent plant rows.

5. A harvesting machine comprising: a supporting frame; drive wheels supporting the rear extremity of said frame; guide wheels supporting the forward extremity of said frame; conveyor members extending from above the rear extremity of said frame downwardly and outwardly below the forward extremity of said frame so as to align at their forward extremities with two plant rows; rotary cutting knives journalled at the forward extremities of said conveyor members and adapted to sever the plants along the rows; guide members extending forwardly from said cutting knives so as to elevate the plants before the cutting operation; means for causing the forward extremities of said conveyor members to approach or move away from each other so as to align them with adjacent plant rows, said means comprising, a yoke supporting the forward extremity of each conveyor member, said yoke being laterally movable in said frame; a lever connected at each of its extremities to one of said yokes; and means for swinging said lever so as to cause said yokes to move away from or toward each other.

6. A harvesting machine comprising: a supporting frame; drive wheels supporting the rear extremity of said frame; guide wheels supporting the forward extremity of said frame; conveyor members extending from above the rear extremity of said frame downwardly and outwardly below the forward extremity of said frame so as to align at their forward extremities with two plant rows; rotary cutting knives journalled at the forward extremities of said conveyor members and adapted to sever the plants along the rows; guide members extending forwardly from said cutting knives so as to elevate the plants before the cutting operation; means for causing the forward extremities of said conveyor members to approach or move away from each other so as to align them with adjacent plant rows; and means for raising or lowering each yoke independent of the other yoke.

7. A harvesting machine comprising: a supporting frame; drive wheels supporting the rear extremity of said frame; guide wheels supporting the forward extremity of said frame; conveyor members extending from above the rear extremity of said frame downwardly and outwardly below the forward extremity of said frame so as to align at their forward extremities with two plant rows; rotary cutting knives journalled at the forward extremities of said conveyor members and adapted to sever the plants along the rows; guide members extending forwardly from said cutting knives so as to elevate the plants before the cutting operation, said conveyor members being universally hinged adjacent and rearward said extremities so that their forward extremities may be independently raised or lowered or moved laterally.

8. In a vine harvesting machine, means for cutting said vines comprising: a U-shaped yoke adapted to extend over and downwardly on each side of a row of vines; co-acting rotary cutting knives carried by the lower extremities of said U-shaped yoke adapted to move along said row; a drive chain for each of said knives, said chains co-acting to convey the cut vines rearwardly; and a channel member above each of said chains adapted to support said vines as they are conveyed rearwardly by said chains.

9. A harvesting machine arranged to be drawn along rows of plants comprising: knives arranged to cut the plants along the rows: flexible elevating mediums adapted to engage opposite sides of said plants and convey them rearwardly and upwardly; and a pair of longitudinally extending slides positioned parallel to said elevating mediums and arranged to slidably support said plants as they are elevated, said slides being spaced apart to allow an intervening slot for the passage of the stems of said plants.

ONTJE POEN.